United States Patent [19]

Jones

[11] Patent Number: 5,386,184
[45] Date of Patent: Jan. 31, 1995

[54] SYSTEM FOR USE WITH AN ELECTRONICALLY COMMUTATED ELECTRICAL MACHINE

[75] Inventor: William D. Jones, Swampscott, Mass.

[73] Assignee: General Electric Company, Cincinnati, Ohio

[21] Appl. No.: 97,546

[22] Filed: Jul. 23, 1993

[51] Int. Cl.⁶ ............................................. H02P 1/46
[52] U.S. Cl. ................................. 318/701; 318/138; 318/254; 318/439; 318/787
[58] Field of Search ............... 318/701, 138, 254, 439, 318/787

[56] References Cited

U.S. PATENT DOCUMENTS

| | | | |
|---|---|---|---|
| 4,682,093 | 7/1987 | Murphy et al. | 318/701 |
| 4,983,902 | 1/1991 | Palaniappan et al. | 318/701 |
| 5,150,028 | 9/1992 | Palaniappan | 318/701 |
| 5,180,960 | 1/1993 | Austermann | 318/701 |
| 5,204,604 | 4/1993 | Radun | 318/701 |
| 5,223,779 | 6/1993 | Palaniappan | 318/701 |

*Primary Examiner*—William M. Shoop, Jr.
*Assistant Examiner*—Karen Masih
*Attorney, Agent, or Firm*—Jerome C. Squillaro; Bernard E. Shay

[57] ABSTRACT

A modified inverter/converter unit electronically commutates a switched reluctance machine to provide multiple voltage levels for engine and aircraft applications. A set of power switching transistors apply an exciting current to windings in the switched reluctance machine to produce power at a first voltage level. Additional voltage levels may be provided by using the turns ratio from one or more transformers and the switching frequency from the power switching transistors. Alternatively, additional voltage levels may be provided by using windings of a plurality of transformers internal to the switched reluctance machine.

16 Claims, 4 Drawing Sheets

SYSTEM FOR USE WITH AN ELECTRONICALLY COMMUTATED ELECTRICAL MACHINE

BACKGROUND OF THE INVENTION

The present invention relates to aircraft engine systems and, more particularly, to an electric starter/generator for aircraft, tank engines, and other mobile vehicles.

Brushless dc machines require electronic commutation in order to operate properly. Existing bridge-type or bifilar type inverter/converter units are used to electronically commutate a switched reluctance machine to produce direct current electrical power at only one voltage level at a time when in the generating mode. This creates a problem for vehicles that require dc power of at least two different voltage levels, most commonly 270 vdc and 28 vdc.

Present day switched reluctance machines typically generate electric power at one voltage level. With bifilar type inverter/converter units, close magnetic coupling between the bifilar windings is required so that the power switches will not be subjected to high and potentially damaging voltages resulting from electronic switching. Unfortunately, present technology of machines with bifilar windings use separate windings with a certain amount of average physical separation between the windings which results in looseness in the magnetic coupling of the bifilar windings. This looseness in magnetic coupling between the bifilar windings in the machine results in leakage inductances that can cause undesirable effects such as overvoltages on components, particularly power transistors during switching events. Also, higher leakage inductances cause increased power losses and reduced efficiencies.

Existing machines have further limitations as well. For example, an electric power system, particularly in a vehicle, may require electric power at two or more voltage levels. One means for providing the two different voltage levels is to use an additional, external converter to convert electrical power from one voltage level to another. Unfortunately, the application of an external converter is an inefficient use of components, since it adds cost and volume to the system and reduces reliability.

It is therefore highly desirable and an object of the present invention to provide multiple voltage levels without the addition of an external converter.

Another object of the present invention is to provide simultaneous multiple voltage levels for electronically commutated electrical machines.

Another object of the present invention is to improve magnetic coupling between bifilar windings inside electromechanical machines.

Another object of the present invention is to optimize electric power systems to engine and aircraft applications, extending design flexibility.

These objects and other features and advantages will become more readily apparent in the following description when taken in conjunction with the appended drawings.

SUMMARY OF THE INVENTION

The present invention has been developed to fulfill the needs noted above. The present invention uses a modified inverter/converter unit to electronically commutate a switched reluctance machine which is capable of permitting optimization of electric power systems to engine and aircraft applications. Electric power is supplied simultaneously at multiple different voltage levels from the same electronics, without an additional external converter. Consequently, power can be supplied to a starter/generator machine during starting, and power at a different voltage level can simultaneously be supplied to other pieces of equipment.

Briefly, in accordance with the present invention, multiple voltage levels are provided from the same device. In one embodiment, a method for providing multiple voltage levels comprises the steps of providing an inverter/converter unit, including a switched reluctance machine having internal bifilar windings, the unit capable of supplying loads at a first voltage level. A set of power switching transistors applies an exciting current to the bifilar windings in the switched reluctance machine to produce power at a second voltage level.

In accordance with a second embodiment of the present invention, the transformers are incorporated within the switched reluctance machine. This method for providing multiple voltage levels comprises the steps of providing an inverter/converter unit, including a switched reluctance machine having a plurality of transformers. A set of power switching transistors apply an exciting current to windings in the switched reluctance machine to produce power at a first voltage level. Additional windings inside the switched reluctance machine provide voltage at at least one additional voltage level.

In a third embodiment, a method for providing multiple voltage levels comprises the steps of providing an inverter/converter unit, including a switched reluctance machine and further including a plurality of transformers. A set of power switching transistors applies an exciting current to windings in the switched reluctance machine to produce power at a first voltage level. With the turns ratio from the transformers and the switching frequency of the power switching transistors, at least one additional voltage level is provided.

In the drawings as hereinafter described, a preferred embodiment is depicted; however, various other modifications and alternative constructions can be made thereto without departing from the true spirit and scope of the invention. For example, the process can be applied to a variety of engine and aircraft applications, including electric starter/generators for aircraft, tank engines, and other mobile vehicles.

DETAILED DESCRIPTION OF THE PREFERRED EMBODIMENTS

Figure 1:
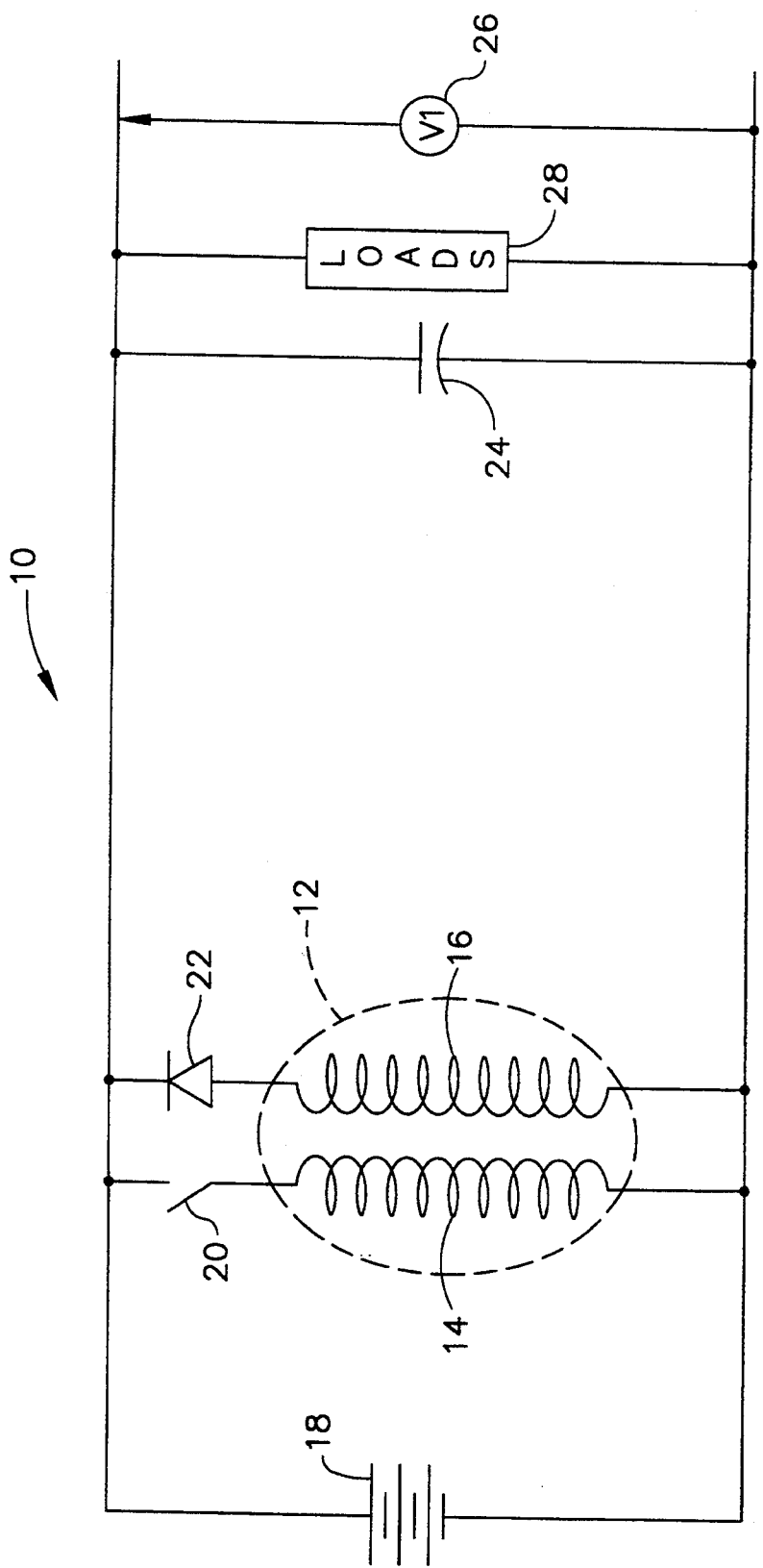
FIG. 1 is a schematic diagram of a prior art bifilar type inverter/converter unit.

Referring now to the drawings, in FIG. 1 there is illustrated a schematic diagram of a prior art bifilar type inverter/converter unit 10, including a switched reluctance machine (SRM) 12 including a first bifilar winding 14 and a second bifilar winding 16. The SRM 12 is a synchronous machine that uses electronic commutation for proper operation. As is known in the art, a SRM includes a rotor, a stator, and a plurality of phase windings. The SRM 12 has no rotating windings or magnets for excitation, but only stationary windings on the stator that are excited with electric current from a power source such as battery 18 at the proper time before alignment to pull the rotor poles into alignment and thereby produce motoring action. To generate electric power, the SRM stator windings are excited when the rotor and stator poles are at or near alignment and deexcited as the two poles are pulling out of alignment. This produces a time rate of change of magnetic flux linking the stator and winding and thereby generates electric voltage and power. The application and removal of electric current to phase windings is performed by an electronic package referred to as the inverter/converter unit (ICU) 10 that performs the electronic commutation. This is the case for both a bifilar type SRM and a bridge-type SRM.

Continuing with FIG. 1, switch 20 is closed at the proper time to create a magnetic field that pulls the rotor and stator poles into alignment to produce motoring action. Switch 20 is closed at or prior to rotor and stator pole alignment and opened as the poles are being pulled out of alignment by a prime mover. The magnetic flux linkages of the machine windings of the SRM 12 undergo a time variation and produce a voltage that circulates currents through diode 22 to charge capacitor 24 and produce a first voltage level 26 to supply loads 28.

The problem of higher leakage inductances between magnetically coupled bifilar windings inside the machine 12 creates high voltages on components as well as increased power losses and reduced efficiencies. The present invention solves for this problem by making the conductors of both windings 14 and 16 effectively occupy the same physical cross-sectional position when averaged over the length of the conductor bundle. This can be accomplished by making all conductors, desired to be magnetically coupled, out of one group of electrically insulated stranded conductors having a cross-sectional area sized to carry the required current for all windings. The individual conductor strands that make up the bundle which constitutes the windings to be magnetically coupled will undergo a three dimensional spatial transposition such that on average each strand will occupy all possible cross-sectional positions along the axial length of the windings. Transposition in this manner exposes all strands on average to the same level of magnetic flux and hence provides a very high degree of magnetic coupling, i.e., provides low leakage magnetic fluxes between the windings, actually approaching zero leakage inductance.

Once all conductors for the bundle that constitutes the coupled windings are tightly coupled magnetically, the individual strands are separated into two groups which are electrically isolated but magnetically coupled. The bundle may then be wound inside the machine 12 to make up the bifilar windings 14 and 16, and connected to the ICU 10 electronics. One of the two groups of conductors is connected to the switching transistor 20 and the other group of conductors is connected to the diode 22. This pattern may be repeated for each phase of the switched reluctance machine 12 and inverter/converter unit 10. Also, as will be obvious to those skilled in the art, the present invention addresses bifilar machine windings for purposes of illustration only, and any number of windings for any type of electrical machine can be coupled in the manner provided for herein to achieve low leakage inductance among the windings.

Figure 2:
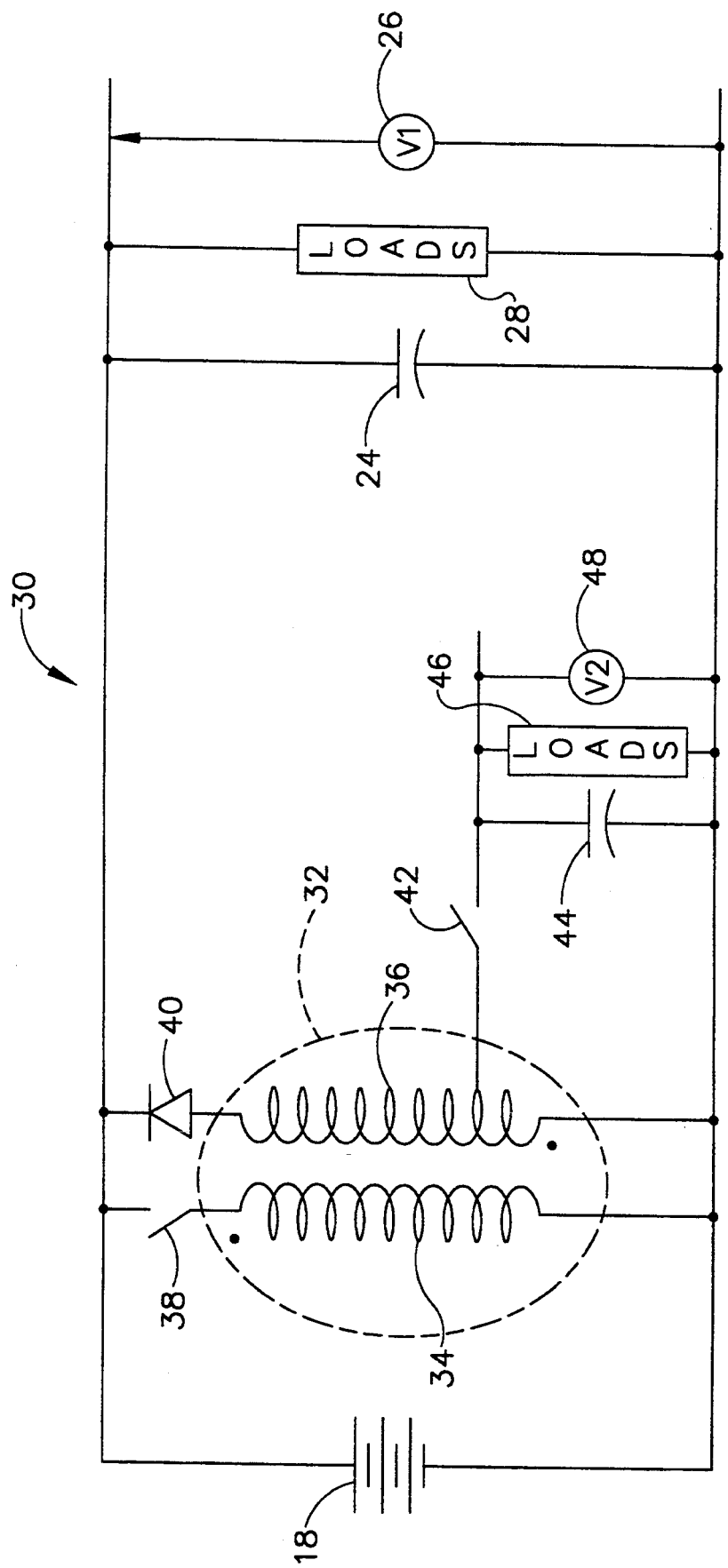
FIG. 2 is a schematic diagram for achieving multiple levels of voltage from a switched reluctance machine inverter/converter unit, in accordance with one embodiment of the present invention.

Referring now to FIG. 2, the present invention incorporates additional circuitry inside inverter/converter unit 30 to produce electric power at two or more voltage levels. The switched reluctance machine is a multiple phase device, usually three phases. FIG. 2 illustrates one phase of a switched reluctance machine 32 of the inverter/converter unit 30 of the present invention. A phase windings bifilar pair inside the machine 32, represented by reference numbers 34 and 36, comprise a very tight electromagnetic coupling. The internal first and second windings 34 and 36 are energized by closing transistor switch 38 at the appropriate time so that electric current flows through the winding 34 from a dc power source such as battery 18. After the dc power source has been connected to winding 34 for the desired length of time, winding 34 is disconnected from the power source 18 by opening transistor switch 38. Once switch 38 is opened, electric current flows to the dc link via winding 36 and diode 40. A portion of this induced current flows through the tapped point on winding 36 and through transistor switch 42 to charge capacitor 44, as well as to help supply loads 46 at second voltage level V2, designated as reference number 48. Switch 42 can be used to help regulate voltage 48. Alternatively, switch 42 may be replaced by a diode and the bus voltage can be naturally regulated. The dc link associated with the bus voltage 26 may be separate or shared with voltage 48.

In FIG. 2, closing switch 38 energizes winding 34. When switch 38 is opened, a voltage is induced in winding 36 which circulates current through diode 40 and charges capacitor 24 to establish the first voltage level 26. In accordance with the present invention, winding 36 has almost unity magnetic coupling with winding 34 and thereby greatly reduces the amount of voltage over-shooting due to current experienced by switch 38. This results in the need for either fewer or lower voltage rated switches and, thus, a smaller, lower cost inverter/converter unit. Other voltages can be obtained from the ICU by tapping winding 36. The magnitude of the voltage is a function of the turns included between the tapped point and the voltage reference point, where 34 and 36 are windings inside the machine 32.

Figure 3:
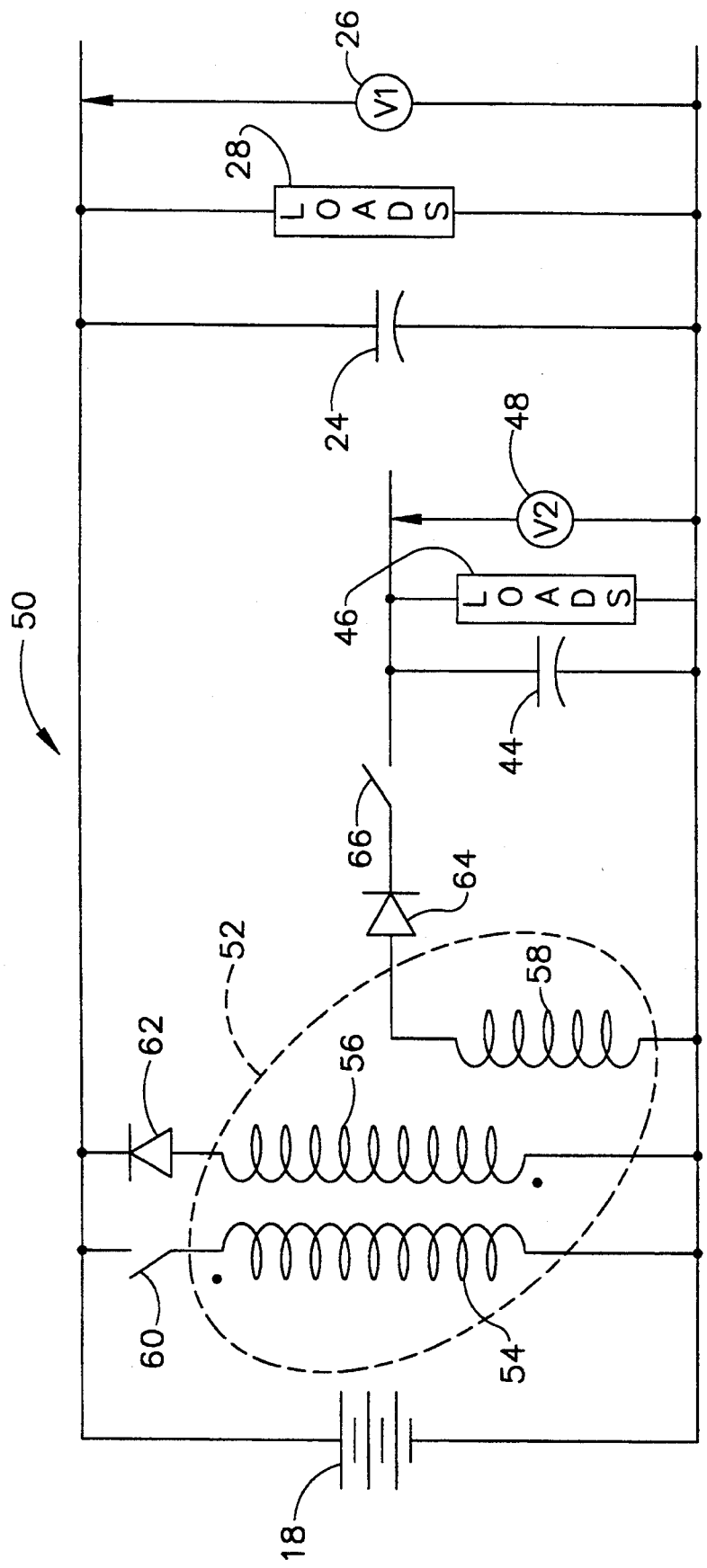
FIG. 3 is a schematic diagram for achieving multiple levels of voltage from a switched reluctance machine inverter/converter unit, in accordance with a second embodiment of the present invention.

Referring now to FIG. 3, there is illustrated a schematic diagram for achieving multiple levels of voltage from an inverter/converter unit 50, including a switched reluctance machine 52, in accordance with a second embodiment of the present invention. The switched reluctance machine 52 includes a first winding 54 and a second winding 56. The schematic of FIG. 3 is similar to FIG. 2, but includes a third winding 58 which may, but is not required to, use the close magnetic coupling technique of the present invention described with reference to FIG. 2.

FIG. 3 again illustrates one phase of an SRM of an inverter/converter unit of the present invention. The windings inside the machine, represented by 54 and 56, are energized by closing transistor switch 60 at the appropriate time so that electric current flows through the winding 54 from a DC power source such as battery 18. After the dc power source has been connected to winding 54 for the desired length of time, it is disconnected from the power source by opening transistor switch 60. Once switch 60 is opened, electric current flows to the dc link through the bifilar winding 56 and diode 62, thus supplying electric power to loads 28 at voltage 26.

The rapid change in current flowing through winding 54 when switch 60 opens also induces a voltage in internal transformer winding 58 that supplies loads 46 at voltage 48. Diode 64 is used to allow unidirectional flow of current in the internal transformer winding 58. In FIG. 3 then, the third winding 58 is electrically isolated from the other output voltages. Diode 64 allows for unidirectional current to flow to loads 46 at voltage 48. Hence, diode 64 may be used with or replaced by a unidirectional transistor switch 66 which may then be used to regulate power at voltage 48. The magnitude of voltage 48 in general is at a voltage level different from voltage 26 and is a function of the turns ratio of winding 58 relative to windings 54 and 56 for a given magnitude and frequency of the switched current.

Figure 4:
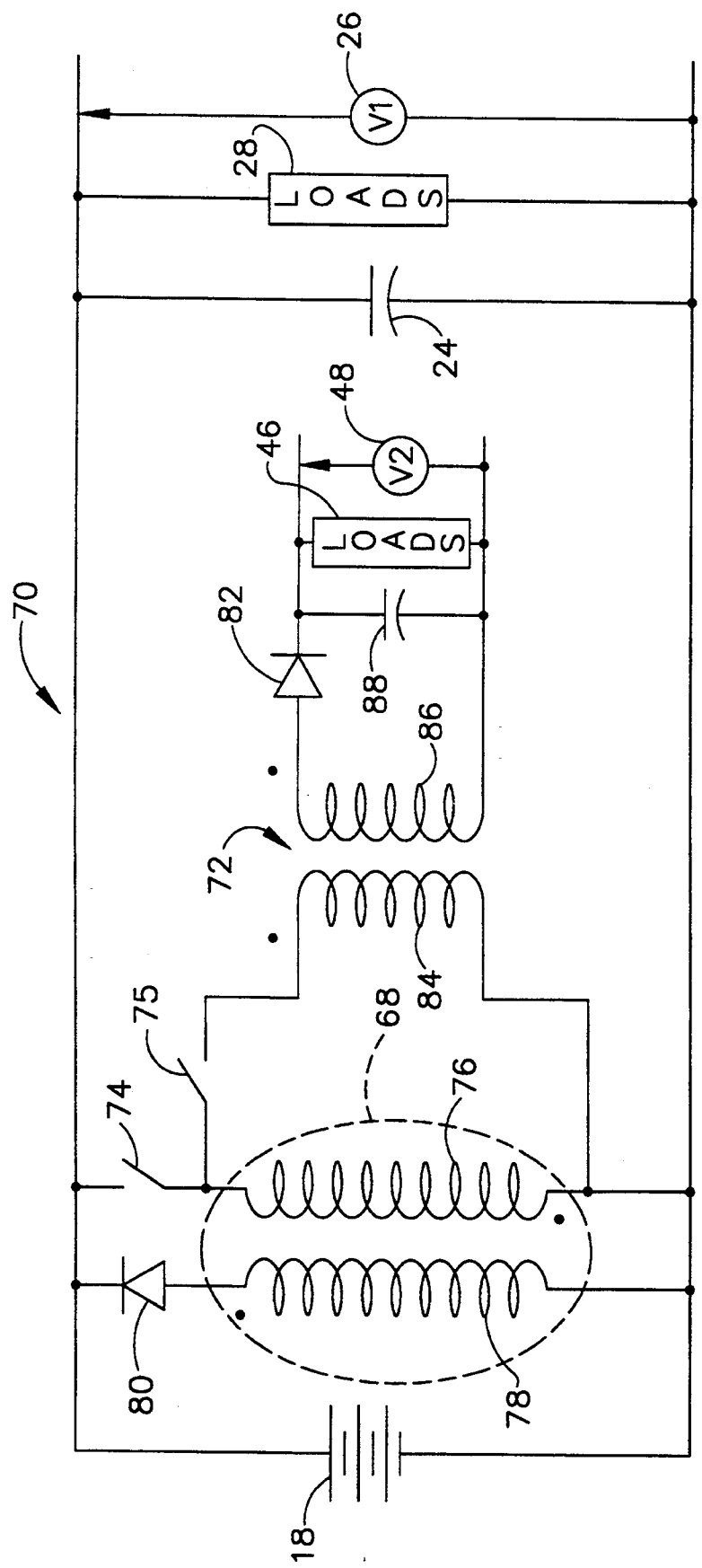
FIG. 4 is a schematic diagram for achieving multiple levels of voltage from a switched reluctance machine inverter/converter unit, in accordance with a third embodiment of the present invention.

FIG. 4 is a schematic diagram for achieving multiple levels of voltage from a switched reluctance machine 68 of an inverter/converter unit 70, in accordance with a third embodiment of the present invention. In FIG. 4, a transformer 72 located in the inverter/converter unit 70 is energized by switches 74 and 75. Switch 74 is also used to excite bifilar windings 76 and 78. The bifilar windings 76 and 78 are closely coupled. Diode 80 allows unidirectional current to flow to loads 28 supplied by voltage 26. Diode 82 allows unidirectional current to flow to loads 46 supplied by voltage 48.

In FIG. 4, there is illustrated one phase of the inverter/converter unit 70 of the present invention. The phase windings bifilar pair inside the machine, represented by 76 and 78, are energized by closing transistor switch 74 at the appropriate time so that electric current flows through the winding 76 and through winding 84 of transformer 72 from adc power source such as battery 18. After the dc power source has been connected to winding 76 for the desired length of time, winding 76 and transformer 72 are disconnected from the power source by opening transistor switch 74. Once switch 74 is opened, induced electrical current flows to the dc link through the bifilar winding 78 and diode 80, thus supplying electric power to loads 28 at voltage 26.

The rapid change in current flow through winding 84 of transformer 72 when switch 74 opens induces a voltage in winding 86 of transformer 72 that supplies loads 46 at voltage 48. Diode 82 is used to allow unidirectional flow of current in the secondary winding of transformer 72. Diode 82 may be replaced by a unidirectional transistor switch which may then be used to regulate power at voltage 48. The magnitude of voltage 48 in general is at a voltage level different from voltage 26 and is a function of the turns ratio of transformer 72 for a given magnitude and frequency of the switched current. Once switch 74 is opened, electric current flows to the dc link and a portion of this induced current is used to charge capacitor 88.

It should be noted that although the machine addressed herein is a switched reluctance machine using bifilar windings for each phase of the machine, it will be obvious to those skilled in the art that the concept of the present invention is applicable to any electromechanical machine.

It is seen from the foregoing, that the objectives of the present invention are effectively attained, and, since certain changes may be made in the construction set forth, it is intended that matters of detail be taken as illustrative and not in a limiting sense.

What is claimed is:

1. A method for providing multiple voltage levels from a single device, the method comprising the steps of:
   using an inverter/converter unit to electronically commutate a switched reluctance machine, the switched reluctance machine having internal first and second windings;
   inducing a voltage in the second winding of the switched reluctance machine to establish a first voltage level;
   using at least one power switching transistor to apply an exciting current to the first and second windings in the switched reluctance machine to generate power at at least one additional voltage level.

2. A method for providing multiple voltage levels from a single device as claimed in claim 1 wherein the internal first and second windings comprise windings with very tight electromagnetic coupling, 3. A method for providing multiple voltage levels from a single device as claimed in claim 1 wherein the internal first and second windings comprise a phase windings bifilar pair.

4. A method for providing multiple voltage levels from a single device as claimed in claim 1 further comprising a transistor switch for regulating the at least one additional voltage level.

5. A method for providing multiple voltage levels from a single device as claimed in claim 1 wherein magnitude of the at least one additional voltage level is a function of turns included between a tapped point of the internal second winding and a voltage reference point.

6. A method for providing multiple voltage levels from a single device as claimed in claim 1 wherein closing of the at least one power switching transistor energizes the internal first winding.

7. A method for providing multiple voltage levels from a single device as claimed in claim 1 wherein the internal second winding has almost unity magnetic coupling with the internal first winding.

8. A method for providing multiple voltage levels from a single device, the method comprising the steps of:
   using an inverter/converter unit to electronically commutate a switched reluctance machine, the switched reluctance machine containing at least one internal transformer having first and second windings;
   having a third winding internal to the switched reluctance machine;
   using at least one power switching transistor having a switching frequency to apply an exciting current to the first and second windings in the switched reluctance machine to produce power at a first voltage level;
   inducing a voltage in the third winding of the switched reluctance machine by opening the at least one power switching transistor to provide at least one additional voltage level.

9. A method for providing multiple voltage levels from a single device as claimed in claim 8 wherein the third winding is electrically isolated from output voltages.

10. A method for providing multiple voltage levels from a single device as claimed in claim 8 wherein magnitude of the at least one additional voltage level is at a voltage level different from the first voltage level and is a function of a turns ratio of the third winding relative to the first and second windings for a given magnitude and frequency of switched current.

11. A method for providing multiple voltage levels from a single device as claimed in claim 8 wherein the internal first and second windings comprise a phase windings bifilar pair.

12. A method for providing multiple voltage levels from a single device, the method comprising the steps of:
  using an inverter/converter unit to electronically commutate a switched reluctance machine, the switched reluctance machine having internal first and second windings;
  having at least one transformer in the inverter/converter unit;
  using at least one power switching transistor to apply an exciting current to the first and second windings in the switched reluctance machine to generate power at a first voltage level;
  using a turns ratio from the at least one transformer and a switching frequency of the at least one power switching transistor to provide at least one additional voltage level.

13. A method for providing multiple voltage levels from a single device as claimed in claim 12 wherein the at least one transformer is energized by the at least one power switching transistor.

14. A method for providing multiple voltage levels from a single device as claimed in claim 12 wherein unidirectional current flows to loads supplied by the first voltage level.

15. A method for providing multiple voltage levels from a single device as claimed in claim 12 wherein unidirectional current flows to loads supplied by the second voltage level.

16. A method for providing multiple voltage levels from a single device as claimed in claim 12 wherein the internal first and second windings comprise a phase-windings bifilar pair.

* * * * *